July 13, 1926.　　　　M. BIRKIGT　　　　1,592,715
BRAKING DEVICE
Filed Jan. 10, 1921　　　8 Sheets-Sheet 3

Inventor
Marc Birkigt
By
Attorney.

Fig. 6.

July 13, 1926.  
M. BIRKIGT  
BRAKING DEVICE  
Filed Jan. 10, 1921  
1,592,715  
8 Sheets-Sheet 6

Inventor  
Marc Birkigt  
By  
James L. Norris  
Attorney

July 13, 1926.

M. BIRKIGT

BRAKING DEVICE

Filed Jan. 10, 1921

Inventor
Marc Birkigt
By
Attorney

Patented July 13, 1926.

1,592,715

UNITED STATES PATENT OFFICE.

MARC BIRKIGT, OF BOIS-COLOMBES, FRANCE.

BRAKING DEVICE.

Application filed January 10, 1921, Serial No. 436,277, and in Belgium January 27, 1920.

This invention relates to improvements in braking devices, and more particularly to such devices for motor vehicles, which cooperate with the source of motive power for the vehicles, in applying the brakes to the vehicles when desired.

The invention consists in providing the braking devices of the specified kind with such means that the muscularly actuated controlling means such as a foot pedal or hand lever will be able to act alone upon the brakes themselves with which such devices are to be combined, without necessarily bringing into action the system through which the members which are in movement during the running of the vehicle cooperate in the braking action; such acting alone being mainly desirable and obtained when the vehicle is at rest or when, the vehicle being on the back drive, the moving member which furnishes energy to the said devices rotates itself in the contrary sense to that in which it is required to bring into action the said system in view of setting the brakes.

Aside from this principal characteristic, the invention comprises certain additional devices which are preferably used at the same time as the former, and which will be hereinafter described in detail, and especially an arrangement for constituting that part of the said braking system which is used to cause the advance of the vehicle to cooperate with the braking, a suitable clutch so established that its active member proper rotates, around the axis of the other members of said braking system.

The invention especially relates to certain methods of application as well as of construction of the said devices.

The invention can be readily understood by referring to the following description and the accompanying drawings, it being of course understood the same are given by way of examples of the present invention.

According to the present invention, and more especially with reference to preferably employed methods of construction and application, we may suppose that, whilst constructing a motor vehicle having wheels provided with drum brakes having brake shoes mounted inside the drums and operated through eccentrics, it is desired to provide the said brakes with means for operating them, the following or similar method is employed.

A primary shaft $a$ is constructed in such manner that it can rotate in bearings on the vehicle frame. The shaft $a$ is mounted transversely of the vehicle frame at a lower level than that of the transmission shaft $b$ of the said frame, and has at one end one or more key-slots $a^1$.

A clutch device is provided, having a member rotatable by the transmission shaft $b$, said rotatable member being adapted to cooperate with an operating device acting to cause (by means of the controlling member of the clutch) an angular displacement of the said primary shaft in the direction which is required for the braking action; its construction is such that this result can be obtained regardless of the direction of rotation of the driving member and so that the rotating member of the clutch can add its effect or torque exerted by the operative means therefor such as the pedal to the muscular torque transmitted by the clutch controlling member, this being the case at least when the vehicle is on the forward drive, the rotating clutch member at that time being turned in the desirable direction. A ratchet wheel arrangement permits the rotating clutch member to remain at a standstill when the vehicle is on its backward drive.

The said clutch and its associated parts may be advantageously constructed as follows for the purpose of obtaining these various effects.

A tubular shaft $c$ is so designed that it shall be relatively short, and it can be mounted loosely upon the middle portion of the primary shaft $a$; the worm wheel $d$ which has preferably a small pitch is mounted in such manner as to be connected to the said tubular shaft $c$ through suitable means which shall allow it to operate the said primary shaft, but only when the shaft $b$ and the worm wheel $d$ rotate in the direction corresponding to the forward drive; means are also provided constituting a free ratchet wheel device, comprising an internal passive member $e$ and an external active member $e'$ the said internal passive member being adpted to be keyed upon the middle part of the said tubular shaft $c$, and the external member $e^1$ which is adapted to be keyed on the said worm wheel $d$. An endless screw $f$ is disposed for the purpose of operating the said worm wheel, and is mounted on the corresponding portion of the said transmission shaft $b$ in a rigid manner so that it is constantly rotated by this shaft.

The said worm wheel and endless screw may be moreover completed by appropriate means, which not only avoid the rotation of the clutch member in the undesirable direction during the backward drive, but also cause the tubular shaft $c$ to rotate only in the desirable direction, independently of the vehicle being on its forward or backward drive.

Figures 2, 3, 15:
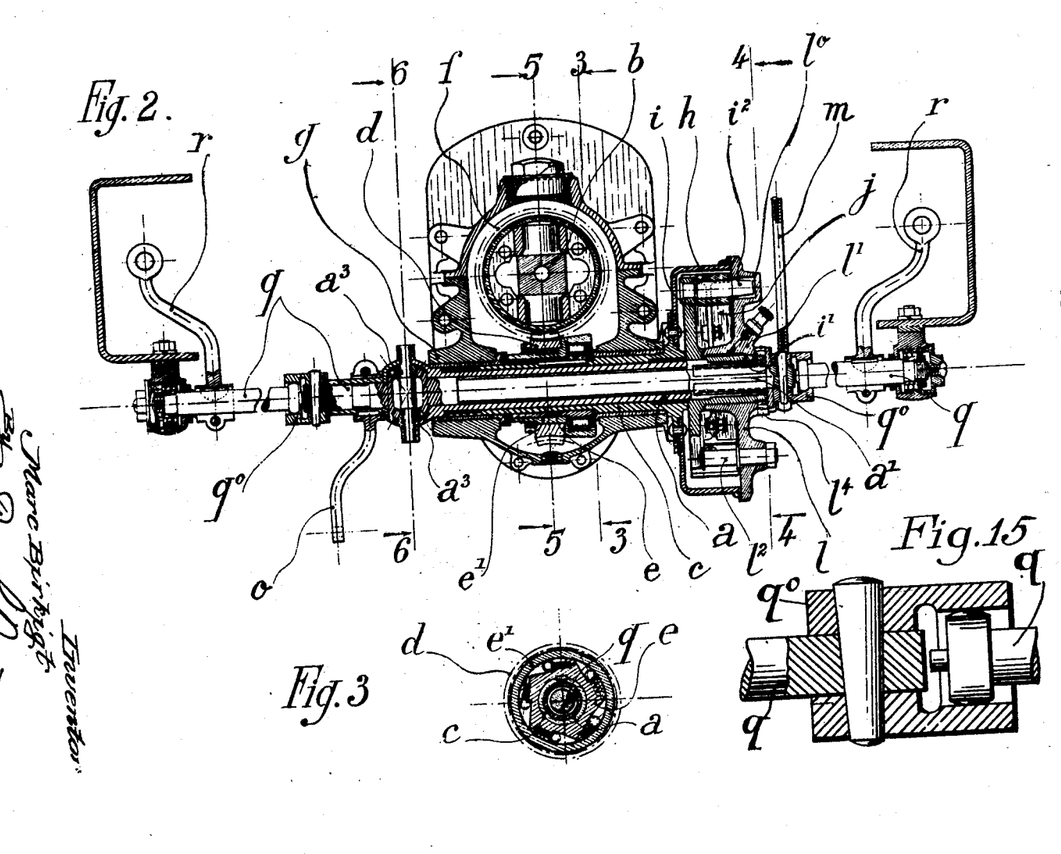
Fig. 2 shows a section of the said vehicle frame along the line 2—2 of Fig. 1.
Figs. 3, 4, 5 and 6 represent sections taken respectively along the lines 3—3, 4—4, 5—5 and 6—6 of Fig. 2, and showing certain members which enter into the construction of the said system.
Fig. 15 is a detail section on the line 2—2 Figure 1, showing the universal joint connecting the sections of the axle.

Moreover, should the transmission shaft be of the universal joint type, as indicated in the drawings, the entire assemblage of the before stated members is, in addition to what has been already set forth, designed and disposed in such manner that the before specified corresponding portion of the transmission shaft shall constitute the block or outer member of the universal joint device, as here shown in the drawings. The system also includes a casing $g$ which is so disposed as to surround the various members before specified, with the exception of the two ends of the said primary shaft $a$ and of that end of the tubular shaft $c$ which lies next the keyslots $a^1$. The said primary shaft is rotatably disposed inside the tubular shaft $c$ in bearings, and the said casing $g$ is mounted on the vehicle frame in the proper manner, for instance upon the speed change box, as here indicated in the drawings. A clutch drum $h$ is provided adapted to be mounted rigidly upon the end of the tubular shaft $c$, with the containing next to the keyslots $a^1$, with the containing portion turned towards the outer side, the said keyslots being thus situated within the clutch drum; the clutch mechanism comprises a rocker arm $i$ mounted inside of the clutch drum and provided with a hub $i^1$, carrying keys corresponding to the keyslots $a^1$ of the primary shaft $a$; the rocker arm $i$ carries at its ends two spindles $i^2$ which are parallel to and equidistant from its axis; the hub is fitted upon the primary shaft as before stated, and secured thereon in order to bring the rocker arm in proximity to the inner disc like bottom of the said drum, the spindles $i^2$ being turned towards the outside. A pair of clutch shoes $j, j$ is disposed so that each shoe will articulate at one of its ends with one of the spindles $i^2$ respectively. By exerting an action upon their free ends they can be pushed outwardly so as to exert a pressure upon the internal surface of the said drum; the springs $k\ k$ are attached respectively to the inner end of one clutch shoe and to the outer end of the other clutch shoe, in order to maintain the assemblage of the shoes normally in the inoperative position. An operating plate $l$ is provided with a hub $l^1$ by which it can be mounted loosely upon the said hub $i^1$, of the rocker-arm $i$ and this operating plate $l$ constitutes a cover piece for the box of the clutch drum $h$, the plate carries two studs $l^2, l^2$, mounted in diametrically opposite position, and these studs are so disposed with respect to the free ends of the clutch shoes that when the plate $l$ is rotated the studs will exert a pressure respectively upon the corresponding clutch shoes $j, j$ and push the shoes outwardly against the action of the springs $k, k$, so that the clutch shoes assume the operative position. The adjusting screw $l^3$ is mounted upon the plate $l$ with its axis tangent to the circumference described by the axes of the spindles $i^2, i^2$, upon the rotation of the rocker arm $i$. This screw $l^3$ acts as an adjustable stop piece for one of the spindles $i^2$ which spindle is extended outwardly (see Figs. 2 and 4) and has its outer end lodged within an elongated recess $l^o$ (see Fig. 4) properly disposed for the purpose upon the plate $l$. The adjusting screw $l^3$ is so disposed that on the one hand the spindle which strikes thereagainst is impelled by means of the springs $k, k$, and which springs also tend to hold the spindle $i^2$ of the rocker lever $i$ and the striking end of the screw $l^3$ in contact and thus maintain the plate $l$ in a given position with reference to the rocker lever $i$. An arm $l^4$ is attached radially to the outer face of the plate $l$, and is employed to operate the latter in connection with a rod $m$ provided with a fork member at each end by which said rod is connected respectively to the said arm $l^4$ and to the brake pedal $n$, and in this manner the plate $l$ is connected to the pedal in such manner that upon operating the latter, the studs $l^2$, $l^2$, will drive out the clutch shoes and cause them to take the operative position.

Figure 1:
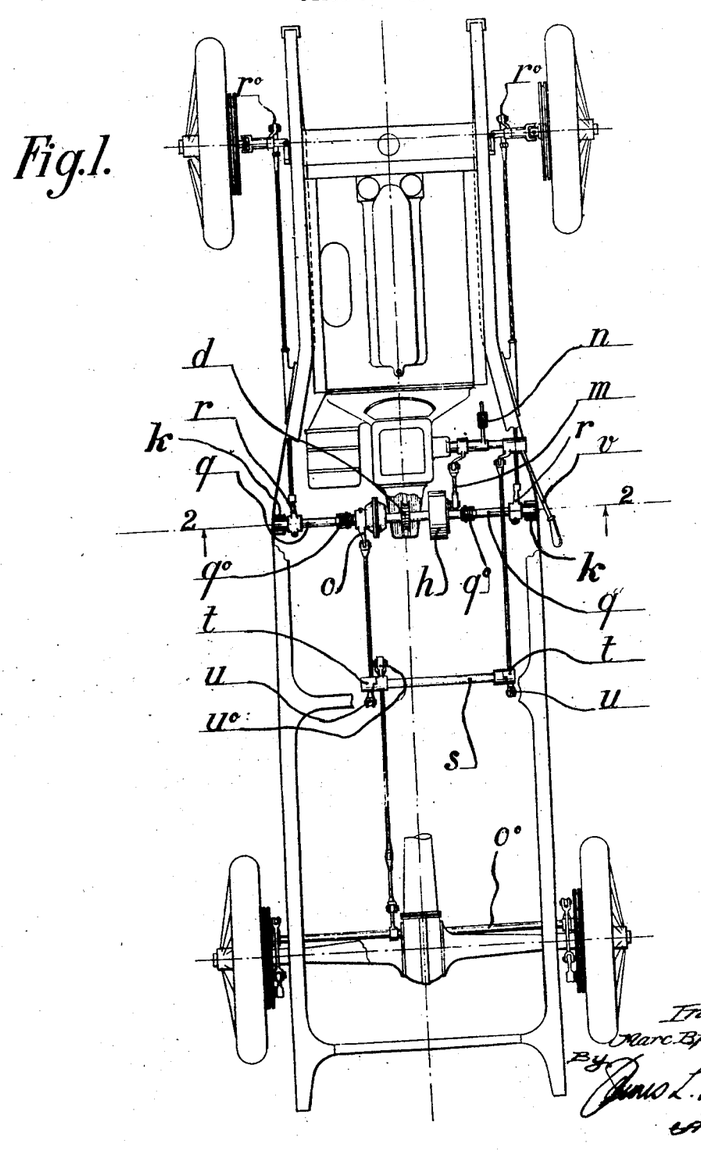
Fig. 1 represents a plan view of diagrammatic nature and on a small scale, with certain parts removed, of a motor vehicle with front wheels and driving wheels provided with brakes which are themselves provided, among other means for operating them, with a device disposed according to the invention.

Upon the primary shaft $a$ is mounted an intermediary lever $o$ (see Figs. 1 and 2) so disposed that, upon the rotation of this shaft, the lever can be employed for throwing the brakes upon the hind or driving wheels. This intermediary lever is connected by a suitable braking movement transmission with the braking shaft $o°$ (see Fig. 1) common to the two eccentrics employed for operating the said brakes and in such manner that when the intermediate lever $o$ (see Fig. 1) is angularly displaced in the direction proper to the action of the before specified ratchet wheel device (or equivalent means), the said brakes will be thrown on.

Figure 6:
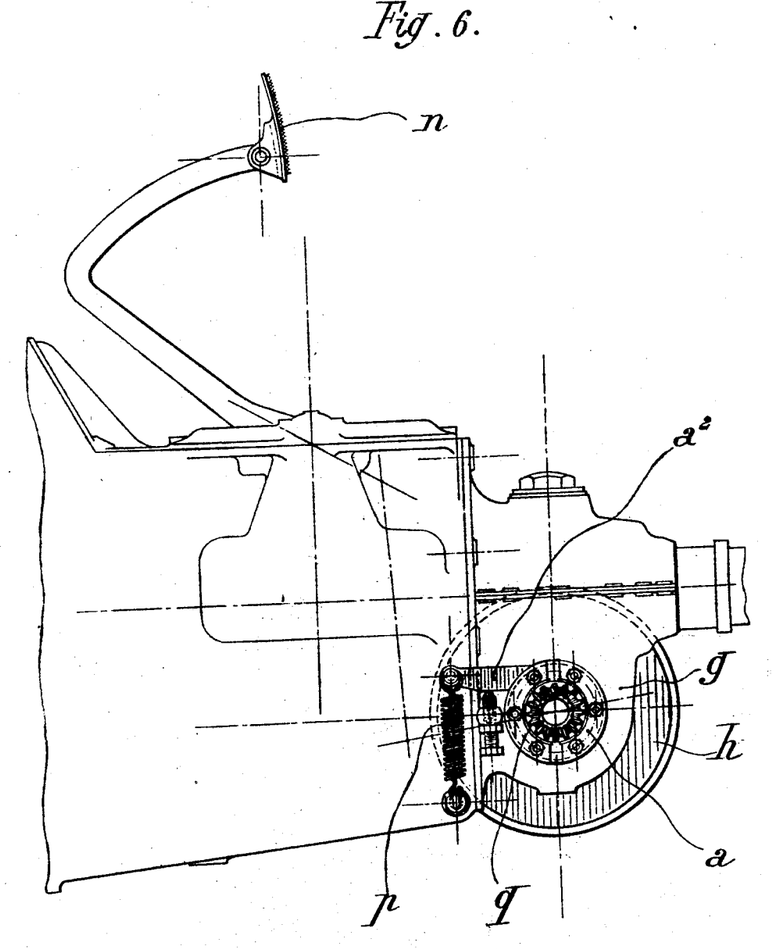

With one member of this brake-movement transmission is combined a device which tends to maintain in an elastic manner the said braking shaft $o°$ in such position as to render the said excentrics inoperative.. To this end, an abutment arm $a^2$ (Fig. 6) is preferably disposed upon an extension of the primary shaft $a$ and submitted to the action of a spring $p$, in order that the said abutment arm and consequently the primary shaft $a$ shall tend to bear against a corresponding adjustable thrust piece mounted on the vehicle frame and to remain in a position such that the braking shaft $o°$ will be in the inoperative position hereinbefore described.

With the various members of the system properly mounted as set forth, and having received proper adjustment, especially the clutch shoes $j$, $j$, and their attached parts which are adjusted so as to always provide at least a slight amount of slip between the shoes and the drum even when the pedal $n$ is driven down to the maximum, an assemblage is obtained which operates in the following manner.

When the vehicle moves or is caused to move forward, the operation of the pedal $n$ causes the corresponding angular movement of the operating plate $l$ and the studs $l^2$, $l^2$, now move in the same sense, as well as the adjusting screw $l^3$, thus releasing at once the spindle $i^2$ of the rocker arm $i$ with which such adjusting screw was previously in contact. The said studs drive the free ends of the clutch shoes $j$, $j$, and the latter tends to operate against the inner surface of the drum, and also to drive the spindles $i^2$, $i^2$, which will thus immediately move as consequence of the rotation of the drum (which is transmitted from the worm wheel $d$ to the said drum through the intermediary of the ratchet wheel device) in the same sense, and will give rise,— through their rocker arm $i$, its hub $i^1$ and the keyslots $a^1$, to an angular displacement of the shaft $a$ such that the eccentrics controlled by the shaft $o°$ will operate their respective brake shoes, and the hind brakes are thus thrown on. During this time, the clutch shoes $j$, $j$, have entered into action against the drum $h$, whereupon this latter acts to carry along the said shoes, which intensifies the action commenced by the foot upon the pedal.

In case the vehicle is either not in motion or moves or is caused to move backwards should it be now desired to act upon the pedal $n$, this pedal will tighten the brake without being assisted by the motor, i.e., the braking will be done exactly as if the braking force increasing system (in order to cause cooperation therewith of the moving parts when the vehicle is running) did not exist, this being effected by the suitable use of a ratchet wheel device or equivalent means. A braking result is obtained during the backward drive as well as during the forward drive, except that the braking action is unassisted by the motor and accomplished only by the muscular action on the pedal.

If, on the contrary, the vehicle frame is of the type containing brakes both on the front wheels and the driving wheels, and should it be desired to establish a system which will also act upon the front wheel brakes, which is the most valuable feature in the application of the present invention, the following method can be employed.

Either the previous arrangement can be utilized, in connecting the lever $o$ to the fulcrum of a straight two armed rocking lever disposed to operate by one of its ends the right hand front wheel brake eccentric, and by its other end the left hand front wheel eccentric in such manner that the said double armed rocking lever will not form an integral part of the brake force increasing system proper, but operates so that when the said lever $o$ is moved in the proper angular sense it will act with equal force upon the said eccentrics. The previously described brake force increasing system is still used, but at the same time (as precisely shown in the drawings) the brake force equalizing device is made a part of the brake force increasing system. With that end in view the primary shaft $a$ is so constructed that it shall take the form of a hollow primary shaft adapted to contain one of the two parts of a shaft provided with a differential; one end of the hollow primary shaft $a$ can then be employed (preferably the end which does not contain the keyslots $a^1$) for suitably mounting the compensatory bevel gears $a^3$ of the differential. A differential shaft of this kind is disposed so that one of the two parts $q$, $q$, of the differential shaft which the differential divides can be fitted into the hollow shaft $a$ and that the outer ends of these two parts can be respectively mounted in bearings upon the side members of the vehicle frame. Thus the limited angular brake movement of the primary shaft $a$ is properly distributed between the two shafts $q\ q$ with the result that the torque received by the left member $q$ is equal to that received by the right member $q$. Universal joints $q^\circ$, $q^\circ$, are preferably disposed upon the said shaft parts $q\ q$ in order to avoid their deterioration which could occur through the deformation to which the vehicle frame is constantly subject. Each of the said shaft parts is provided with a lever $r$, these being respectively connected by suitable means to the corresponding eccentric operating levers $r^\circ$, $r^\circ$.

The said suitable means are preferably—and this applies to the case where the vehicle frame has a restricted width at the front end,—constituted each of a simple wire passed through an opening in the corresponding side rails of the frame; the size and position of the levers $r$, $r$, and the levers $r^\circ$, $r^\circ$, being, as understood, suitably chosen for the purpose.

If it is desired to complete the entire braking system by suitable joint braking means in order to secure not only pedal action but also hand action upon the brakes, such means can be advantageously provided as follows. It is supposed that the hand action is to take effect only upon the driving wheels, which is the case indicated in the drawings. A joint braking shaft $s$ is disposed so as to rotate in bearings upon the vehicle frame and in a position parallel to the said shafts $a$ and to the hind brake shaft $o^\circ$ and placed between the said two shafts; suitable members (not shown here) are provided to secure the mounting of the said joint braking shafts in bearings. A pair of pushing devices $t$, $t$, is disposed respectively at the ends of the said joint braking shaft $s$, and their pushed or driven parts are mounted respectively in rigid connection with the said shaft ends, each pushing device possessing the same sense of operation. A pair of levers $u$, $u$, form part of the respective pushing portions of the said pushing devices; a pair of rods is employed to connect one of the said levers $u$ to the above-mentioned lever $o$, and the other to the hand brake lever $v$ suitably disposed on the vehicle frame; a complementary lever $u^\circ$ forms part of one of the above-specified pushed portions of the pushing devices $t$, $t$; a rod, also of complementary character, is employed to connect the last-mentioned lever $u^\circ$ to the lever carried on the hind brake shaft $o^\circ$ for operation of this shaft.

It will be readily understood that the use of the previously specified assemblage of members will permit of realizing the hand-braking effect to be attained the lever $o$ remaining unmoved, and vice versa the said lever $o$ can become active without disturbing the hand lever $v$.

Figs. 9–13 represent, as already stated, an alternative form of the clutch member.

The object of this alternative form is firstly, to secure a stronger pressure on the clutch shoes $j$ and hence on the inner surface of the clutch drum H, secondly to improve upon the support of the studs $L^2$ on the plate L, and thirdly to render the whole clutch member more compact and allow an easier adjustment of the proper length of the rod M which causes the plate L to partially rotate under the action of a controlling member such as a brake pedal.

In order to obtain the above objects, the following course, or an analogous course may be followed.

The primary shaft A, which has to act on the brakes of the wheels of the vehicle is manufactured as before and bears at its clutch-end keyslots $A^1$ which permit the hub $I^1$ of the rocker lever I to be rigidly keyed on its said end.

The primary shaft A is surrounded by a tubular shaft C which as before is held in rotation, (and a rather slow rotation) as long as the vehicle is running. To the clutch-side end of this tubular shaft C is rigidly secured the open box-like clutch-drum H enclosing the rocker lever I and its hub $I^1$.

Figures 4, 7, 8:
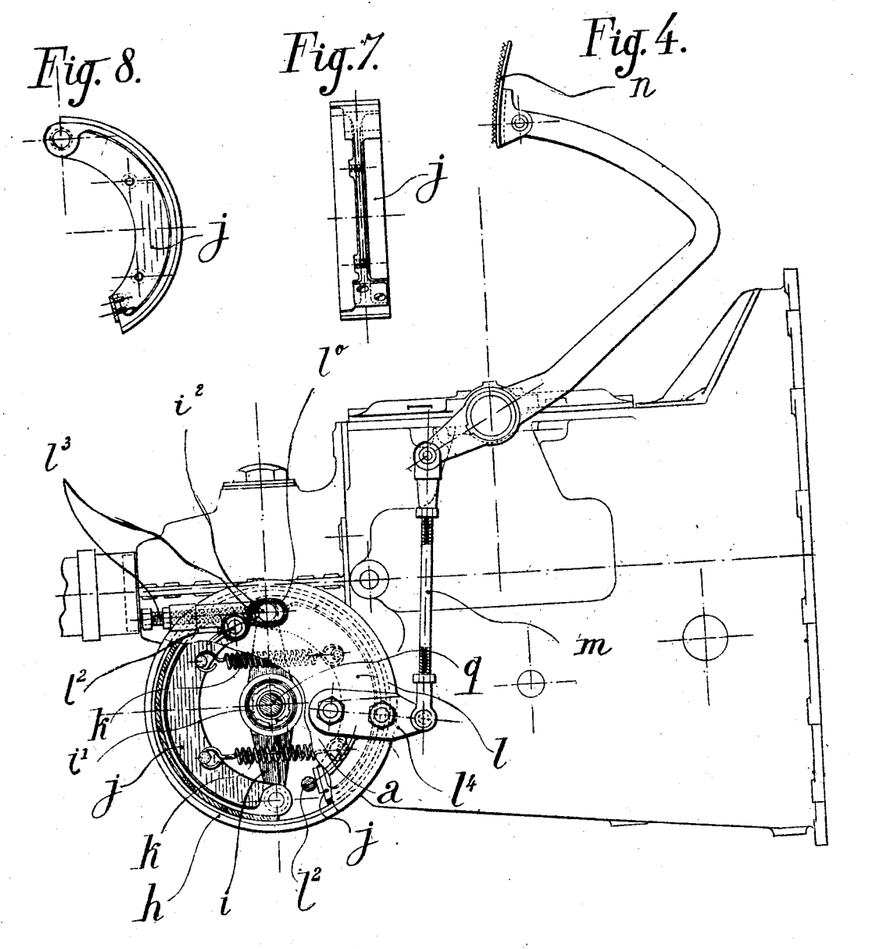
Figs. 7 and 8 represent front and side views respectively of one of the clutch shoes pertaining to the device.
Figure 5:
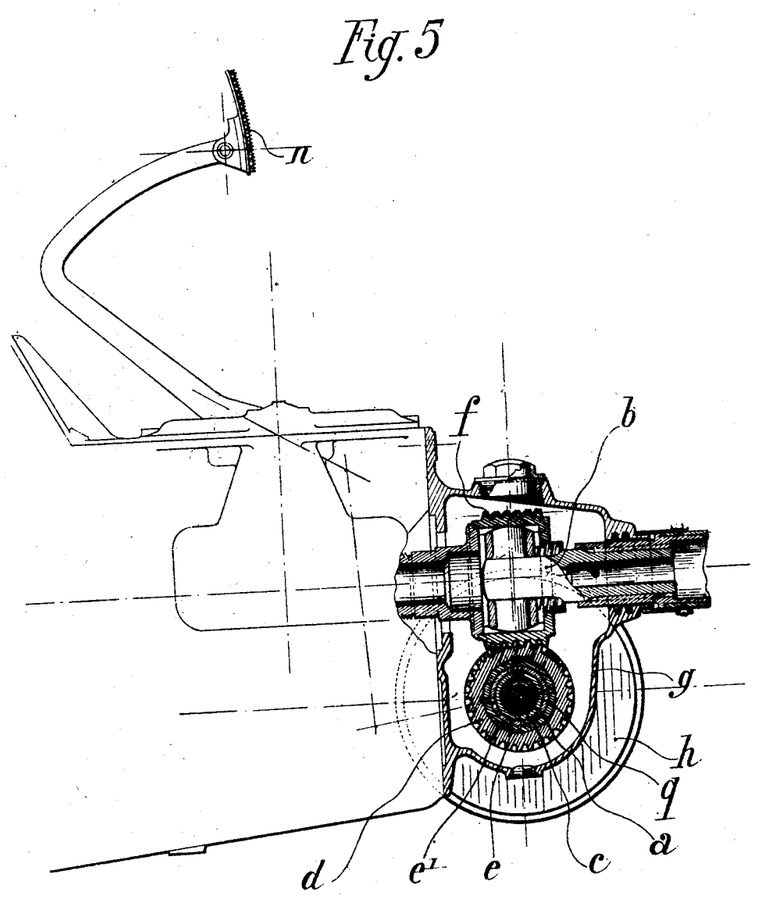

On this hub $I^1$ there is rotatably mounted an operating plate L of a slightly different nature from that seen on Fig. 4.

At the opposite ends of said rocker lever I are again fastened spindles $I^2$ on which the clutch shoes J are hinged, but instead of adapting the free ends of said clutch shoes so as to receive the pressure of the studs of the operating plate L, the clutch shoes are adapted to receive the pressures by means of special fingers $J^1$ situated between said free ends of the shoes and the axis of the operating plate L this axis coinciding with the axis of the rocker lever I. The studs $L^2$ which, as before, form an integral part of the plate L, are now placed, correspondingly to the places of the fingers $J^1$, at radii notably shorter than in the case of the Fig. 4. The springs K, on the contrary, are placed on greater radii than those of the Fig. 4 namely between the fingers $J^1$ and the hinging spindles $I^2$.

The studs $L^2$ owing to their small radii will be able to exert stronger pressures than in the case of Fig. 4. In order to withstand them, said studs $L^2$ are embedded throughout substantially their whole length in holes bored in projections of the hub $L^1$ of the operating plate L, their active pressing parts being left free as can be well understood by the inspection of the Figures 9, 10, and 11.

Figure 9:
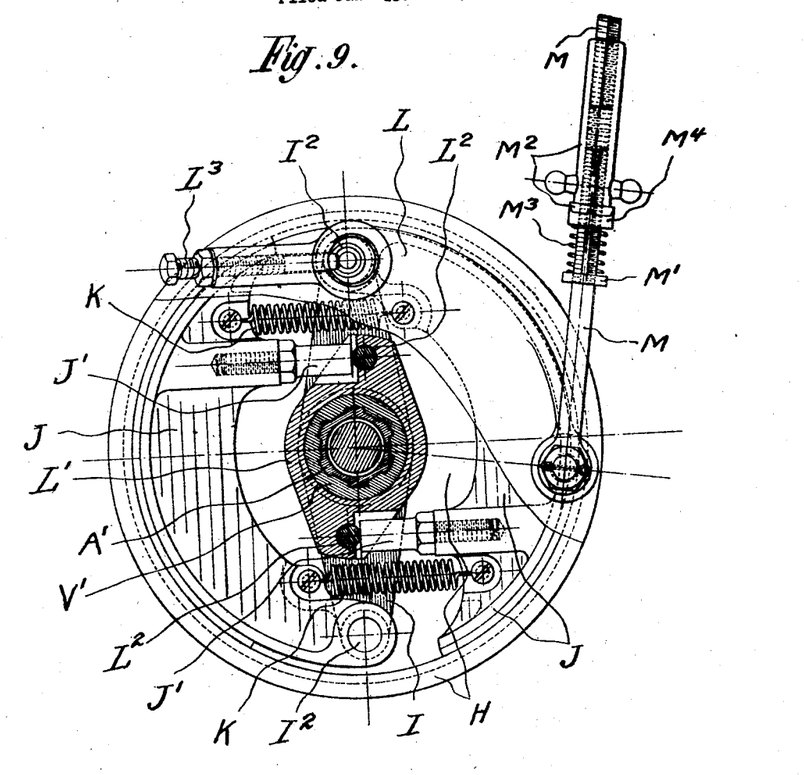
Figs. 9, 10 and 11, represent respectively a front view with some parts removed and others shown in section,—a longitudinal section with some parts in elevation—and a partial plan view of an alternative form of the system or more exactly of its clutch member.
Figure 10:
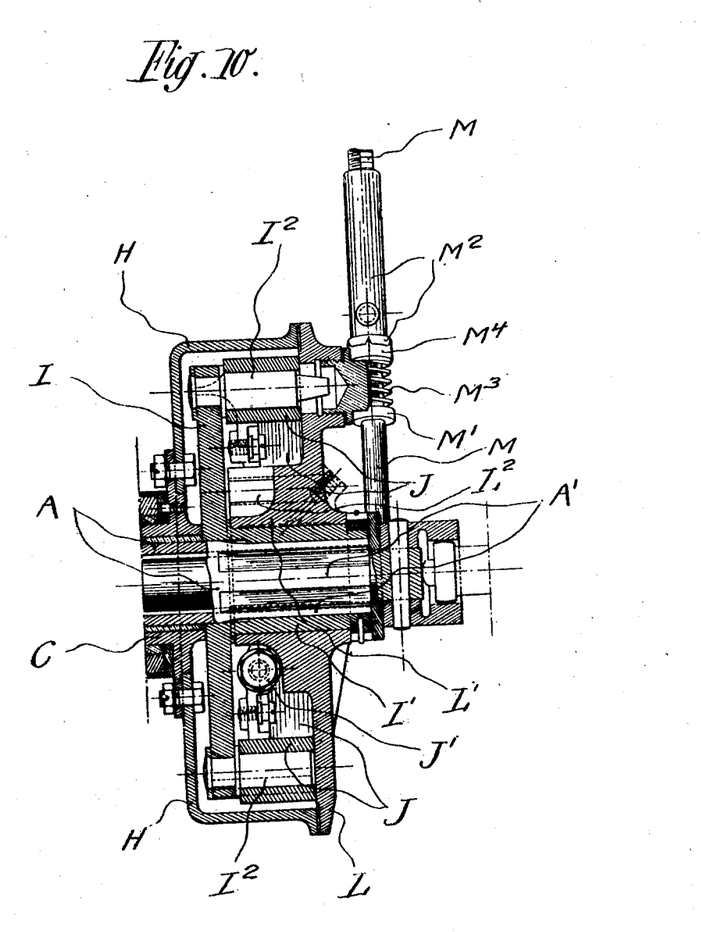
Figure 11:
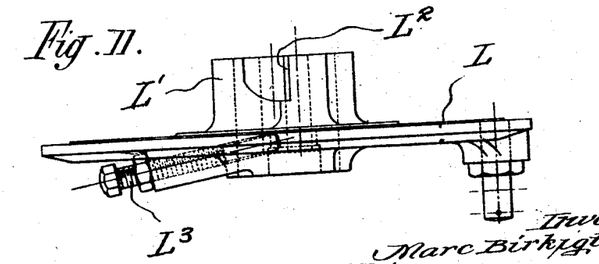

The adjusting screw L³ is in the case of Figs. 9 and 11 disposed not parallelly to the surface of the operating plate L but in an oblique manner so that the recess in which one of the spindles I² of the rocker arm I projects, (and which recess allows a limited play betwen the rocker lever I and the operating plate L) may be less deep than before.

Finally the operating plate L is rotated by means of an alternative form of a rod comprising two members (M, M,) with extremities oppositely threaded, a sleeve M² having correspondingly threaded inner surfaces uniting the said rod members M, M.

As well known it suffices to turn the sleeve in order: to shorten or lengthen a rod made of members such as M, M.

The sleeve M² has means in order to permit this operation even without the help of a wrench, it comprizes also means which permit dispensing of the use of setting means. Such means comprize: a collar M¹ on one of the said rod members M; a helical spring M³ abutting on said collar and surrounding the threaded part of the said rod member; a washer M⁴ axially slidable, but not rotatably, mounted on the said rod member that it will be maintained by the spring M³ against one end of the sleeve M²; edge like teeth on the washer and corresponding notches on the said end of the sleeve of such nature that the turning of the sleeve is possible only under a constantly acting torque but not under the effect of vibrations.

The clutch-side rod member M may be attached to the periphery of the operating plate L instead of being attached to an auxiliary arm as such (l⁴) seen in Fig. 4.

Figure 12:
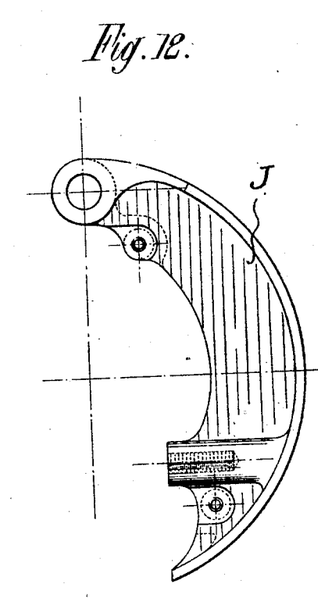
Figs. 12, 13 and 14 represent in front view, elevation and plan view one of the clutch shoes to be utilized in the alternative form represented in Figs. 9—11.
Figure 13:
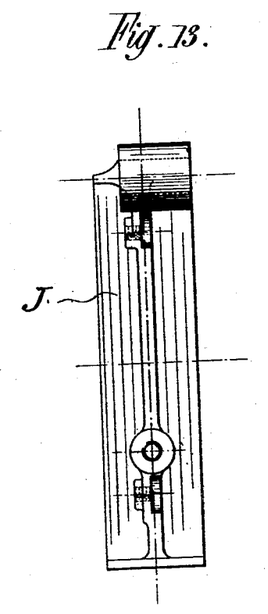
Figure 14:
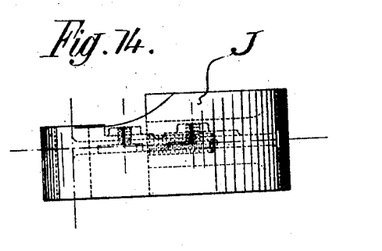

The Figs. 12, 13 and 14 show the alternative form of the clutch shoe comprizing means for the fastening of the finger J¹ and for placing hinging means for the springs K.

It is also evident that, as already stated, the invention is in no wise limited to any of the methods of application or construction which are specifically set forth in the above description, but on the contrary it comprises all alternative forms, especially such as may pertain to the above-mentioned system, but with the interposition of a device between the member constituting the source of power, and the operative portion of the clutch devised to permit the power member to cooperate effectively in the braking of the vehicle, the said interposed device being no longer constituted of a free wheel ratchet member, but by two similar ratchet members of respectively inverse action, these to be interposed in connection with a rotation inversing gear in such manner that the said power member or clutch drum shall always turn in the same direction and shall co-operate in the braking effect both on the backward as well as the forward drive of the vehicle.

I claim:—

1. In a braking system for vehicles, a lever adapted to act directly on the brakes of said vehicle, a clutch operable by the transmission of said vehicle, means for engaging said clutch to co-act with said lever to apply the brakes to the vehicle when the vehicle is in motion, and means for applying said brakes irrespective of said clutch when said vehicle is stationary.

2. In a braking device for a system having driving and driven mechanism, a braking device for said driven mechanism, means for connecting said driving mechanism with the braking device, comprising a primary shaft operatively connected with the braking device and having a rocker lever secured thereto, a secondary shaft rotatably mounted on said primary shaft and in driven connection with the driving mechanism, a clutch box on said secondary shaft and clutch shoes on said rocker lever adapted to be brought into contact with said clutch box.

3. In a braking device for a system having driving and driven mechanism, a braking device for said driven mechanism, means for connecting said driving mechanism with the braking device, comprising a primary shaft rotatably mounted and connected with the braking device, said primary shaft having clutch shoes secured thereto, a secondary shaft rotatably mounted adjacent said primary shaft and having a clutch drum thereon adapted to cooperate with said clutch shoes to form a driving connection between said shafts, a freely rotatable ratchet wheel on said secondary shaft, means connected with said driving mechanism in driving relation with said ratchet wheel and means whereby said ratchet wheel is adapted to rotate said secondary shaft when the ratchet wheel is actuated in one direction and will idle thereon when actuated in the opposite direction.

4. In a braking device for a system having driving and driven mechanism, a braking device for said driven mechanism, means for connecting said driving mechanism with the braking device, comprising a primary shaft rotatably mounted and connected with the braking device, said primary shaft having clutch shoes secured thereto, a secondary shaft rotatably and coaxially mounted on said primary shaft and having a clutch drum thereon adapted to cooperate with said clutch shoes to form a driving connection between said shafts, a freely rotatable ratchet wheel on said secondary shaft, means connected with said driving mechanism in driving relation with said ratchet wheel and means whereby said ratchet wheel is adapted to rotate said secondary shaft when the ratchet wheel is actuated in one direction and will idle thereon when actuated in the opposite direction.

5. In a braking device for a system having driving and driven mechanism, a brake for said driven mechanism, a primary shaft rotatably mounted and connected to said brake, a secondary cylindrical shaft rotatably mounted on the primary shaft, a clutch drum on said secondary shaft, clutch shoes pivotally secured to said primary shaft, a plate rotatably mounted at the end of said drum having studs extending therefrom and adapted to act on said shoes when said plate is rotated in one direction to bring the shoes into braking contact with said drum and driving connection between said driving mechanism and said secondary shaft operable only when the driving mechanism operates in one direction.

6. In a braking device for a system having driving and driven mechanism, a brake for said driven mechanism, a rotatably mounted preliminary shaft, a cylindrical secondary shaft rotatably mounted on said primary shaft, said primary shaft being operatively connected with the brake and said secondary shaft being in driven connection with the driving mechanism, rocker arms on the end of the primary shaft and a clutch drum on the end of the secondary shaft open at one end, spindles extending from the rocker arms in parallelism with each other, clutch shoes pivoted to said spindles and spring pressed away from the surface of said drum, a hub extending from said rocker arms, a plate rotatably mounted on said hub and resting against the open end of said drum, said plate having recesses therein to receive loosely therein the ends of said spindles, studs fixed to said plate and adapted to press the shoes outwardly against the drum when the plate is rotated, adjustable means in one of said recesses forming an abutment for one of said spindles, and means for rotating said plate.

7. In combination with a braking device for wheels of power driven vehicles having brakes associated with both the driving wheels and with the dirigible wheels, means for applying said brakes through the power mechanism of the vehicle and comprising a primary shaft connected to said brakes, a secondary shaft having driven connection with said power mechanism, clutch members on each of said shafts, and means for bringing said members into cooperative relation with each other, a third shaft attached to the driving wheel brakes and mechanism adapted to rotate said shaft to operate said last named brakes independently of said power mechanism.

In testimony whereof I have hereunto set my hand.

MARC BIRKIGT.